United States Patent
Wickramatunga et al.

(10) Patent No.: US 12,470,535 B2
(45) Date of Patent: Nov. 11, 2025

(54) USER ONBOARDING FOR NEW FEATURES OF A CLOUD BASED APPLICATION

(71) Applicant: Oracle International Corporation, Redwood Shores, CA (US)

(72) Inventors: Rajadhi Wickramatunga, Victoria (AU); Joseph Hutchinson, Victoria (AU)

(73) Assignee: Oracle International Corporation, Redwood Shores, CA (US)

( * ) Notice: Subject to any disclaimer, the term of this patent is extended or adjusted under 35 U.S.C. 154(b) by 228 days.

(21) Appl. No.: 18/340,206

(22) Filed: Jun. 23, 2023

(65) Prior Publication Data
US 2024/0430246 A1    Dec. 26, 2024

(51) Int. Cl.
*H04L 9/40* (2022.01)
*H04L 67/10* (2022.01)

(52) U.S. Cl.
CPC .............. *H04L 63/08* (2013.01); *H04L 67/10* (2013.01)

(58) Field of Classification Search
CPC ........ H04L 63/08; H04L 67/10; H04L 63/083
See application file for complete search history.

(56) References Cited

U.S. PATENT DOCUMENTS

| | | | |
|---|---|---|---|
| 9,647,922 B2 | 5/2017 | Mortimore, Jr. et al. | |
| 11,855,871 B1* | 12/2023 | Olden | H04L 63/08 |
| 2002/0010776 A1* | 1/2002 | Lerner | H04L 63/0815 709/225 |
| 2002/0095454 A1* | 7/2002 | Reed | H04L 67/55 709/212 |
| 2006/0111105 A1* | 5/2006 | Bajar | H04W 12/06 455/410 |
| 2013/0332587 A1 | 12/2013 | Maya et al. | |
| 2016/0028688 A1* | 1/2016 | Chizhov | H04W 12/06 726/12 |
| 2021/0390170 A1* | 12/2021 | Olden | H04L 63/08 |
| 2023/0169500 A1* | 6/2023 | Hulick, Jr. | G06Q 20/401 705/44 |
| 2024/0054030 A1* | 2/2024 | Gerstner | G06F 9/542 |

* cited by examiner

*Primary Examiner* — Javier O Guzman
(74) *Attorney, Agent, or Firm* — Potomac Law Group, PLLC

(57) ABSTRACT

Embodiments onboard users of a cloud based application from an old authentication process to a new authentication process. Embodiments receive an onboarding time window and receive a first authentication request from a user via a browser. When the first authentication request is received during the onboarding time window, embodiments associate a cookie with the browser and use the new authentication process to authenticate the user in response to the first authentication request. When the first authentication request is received outside of the onboarding time window, embodiments use the old authentication process to authenticate the user in response to the first authentication request.

20 Claims, 8 Drawing Sheets

USER ONBOARDING FOR NEW FEATURES OF A CLOUD BASED APPLICATION

FIELD

One embodiment is directed generally to a computer system, and in particular to onboarding new features for a cloud based application.

BACKGROUND INFORMATION

Cloud service providers provide various services in the "cloud", meaning over a network, such as the public Internet, that are remotely accessible to any network-connected client device. Examples of the services models used by cloud service providers (also referred to herein as "cloud providers" or "providers") include infrastructure as a service ("IaaS"), platform as a service ("PaaS"), software as a service ("SaaS"), and network as a service ("NaaS"). IaaS providers provide customers with infrastructure resources such as processing, storage, networks, and other computing resources that the customer is able to use to run software. The customer does not manage the infrastructure, but has control over operating systems, storage, and deployed applications, among other things, and may be able to control some networking components, such as firewalls. PaaS providers provide a customer with a platform on which the customer can develop, run, and manage an application without needing to maintain the underlying computing infrastructure. SaaS is a software licensing and delivery model in which software is licensed to a customer on a subscription basis, and is centrally hosted by the cloud provider. Under this model, applications can be accessed, for example, using a web browser. NaaS providers provide network services to customers, for example, by provisioning a virtual network on the network infrastructure operated by another party. In each of these service models, the cloud service provider maintains and manages the hardware and/or software that provide the services, and little, if any, software executes on a user's device.

Customers of cloud service providers, which are also referred to herein as users and tenants, can subscribe to the service provider to obtain access to the particular services provided by the service provider. The service provider can maintain an account for a user or tenant through which the user and/or tenant can access the provider's services. The service provider can further maintain user accounts that are associated with the tenant, for individual users.

As part of providing cloud based applications, and improving such applications, new software features/experiences are continuously being developed. Typically, when a new software feature is rolled out, it will initially be made available to a small set of users during a "limited availability phase." If no issues are detected, the set of users can be increased until the feature is gradually made available to all users during the "general availability phase." Depending on the complexity of the feature and feedback, such a rollout strategy can take weeks, if not months.

SUMMARY

Embodiments onboard users of a cloud based application from an old authentication process to a new authentication process. Embodiments receive an onboarding time window and receive a first authentication request from a user via a browser. When the first authentication request is received during the onboarding time window, embodiments associate a cookie with the browser and use the new authentication process to authenticate the user in response to the first authentication request. When the first authentication request is received outside of the onboarding time window, embodiments use the old authentication process to authenticate the user in response to the first authentication request.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

One embodiment provides a software feature rollout to users who have not yet been identified/authenticated. Embodiments implement a cookie based approach and can be used even when the new feature is directed to the authentication process itself.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
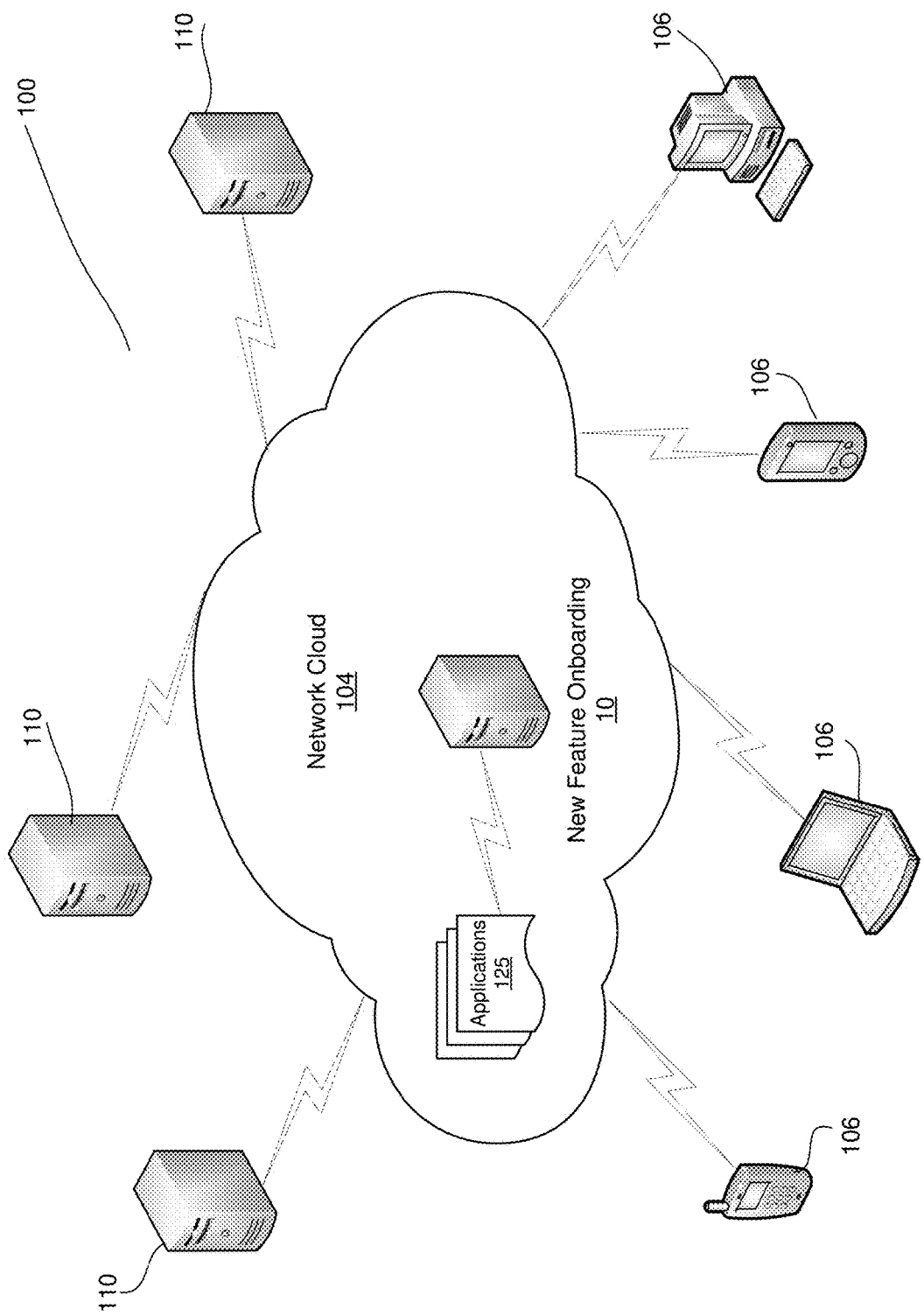
FIG. 1 illustrates an example of a system that includes a new feature onboarding system in accordance to embodiments.

FIG. 1 illustrates an example of a system 100 that includes a new feature onboarding system 10 in accordance to embodiments. New feature onboarding system 10 may be implemented within a computing environment that includes a communication network/cloud 104. Network 104 may be a private network that can communicate with a public network (e.g., the Internet) to access additional services 110 provided by a cloud services provider (i.e., a cloud infrastructure). Examples of communication networks include a mobile network, a wireless network, a cellular network, a local area network ("LAN"), a wide area network ("WAN"), other wireless communication networks, or combinations of these and other networks. New feature onboarding system 10 may be administered by a service provider, such as via the Oracle Cloud Infrastructure ("OCI") from Oracle Corp.

Tenants of the cloud services provider can be organizations or groups whose members include users of services offered by the service provider. Services may include or be provided as access to, without limitation, an application, a resource, a file, a document, data, media, or combinations thereof. Users may have individual accounts with the service provider and organizations may have enterprise accounts with the service provider, where an enterprise account encompasses or aggregates a number of individual user accounts.

System 100 further includes client devices 106, which can be any type of device that can access network 104 and can obtain the benefits of the functionality of new feature onboarding system 10 of the onboarding of new features for an application. As disclosed herein, a "client" (also disclosed as a "client system" or a "client device") may be a device or an application executing on a device. System 100 includes a number of different types of client devices 106 that each is able to communicate with network 104.

Cloud 104 includes a plurality of applications 125, each of which will frequently have new features introduced that need to be onboarded to users in a paced manner. Applications 125 can include any applications hosted by cloud 104, including enterprise applications such as inventory, human resources, manufacturing, etc. In embodiments, the functionality of new feature onboarding system 10 is integrated into each of applications 125.

Figure 2:
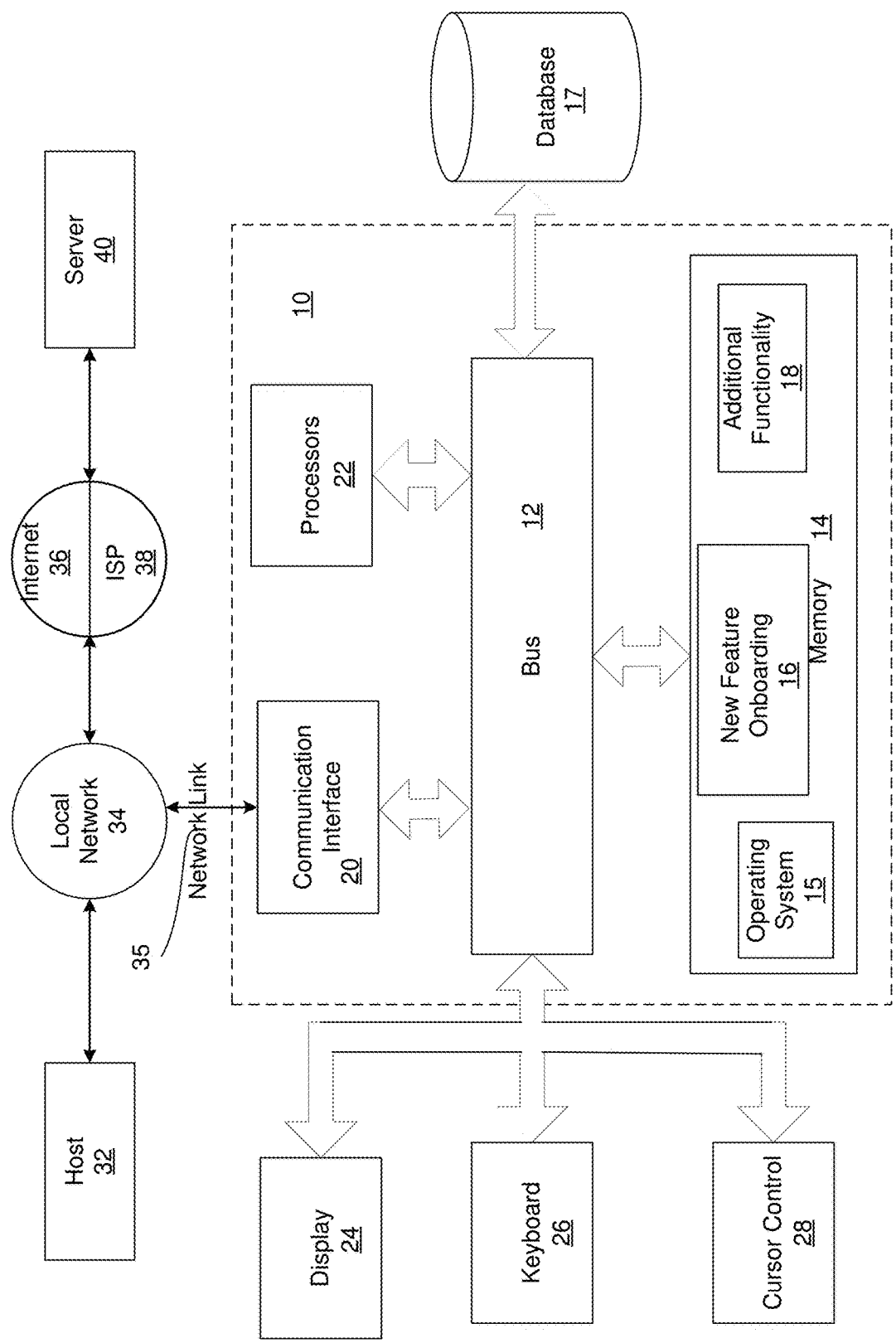
FIG. 2 is a block diagram of a computer server/system in accordance with an embodiment of the present invention that can be used to implement any of the functionality disclosed herein.

FIG. 2 is a block diagram of a computer server/system 10 in accordance with an embodiment of the present invention that can be used to implement any of the functionality disclosed herein. Although shown as a single system, the functionality of system 10 can be implemented as a distributed system. Further, the functionality disclosed herein can be implemented on separate servers or devices that may be coupled together over a network. Further, one or more components of system 10 may not be included. One or more components of FIG. 2 can also be used to implement any of the elements of FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication interface 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a new feature onboarding module 16 that performs onboarding for new features of cloud based applications, and all other functionality disclosed herein. System 10 can be part of a larger system. Therefore, system 10 can include one or more additional functional modules 18 to include the additional functionality that can integrate with or need new feature onboarding functionality, such as applications (e.g., applications 125) that incorporate the new features that need to be onboarded. A file storage device or database 17 is coupled to bus 12 to provide centralized storage for modules 16 and 18, including training data, predefined spend classification categories, etc. In one embodiment, database 17 is a relational database management system ("RDBMS") that can use Structured Query Language ("SQL") to manage the stored data.

In embodiments, communication interface 20 provides a two-way data communication coupling to a network link 35 that is connected to a local network 34. For example, communication interface 20 may be an integrated services digital network ("ISDN") card, cable modem, satellite modem, or a modem to provide a data communication connection to a corresponding type of telephone line or Ethernet. As another example, communication interface 20 may be a local area network ("LAN") card to provide a data communication connection to a compatible LAN. Wireless links may also be implemented. In any such implementation, communication interface 20 sends and receives electrical, electromagnetic or optical signals that carry digital data streams representing various types of information.

Network link 35 typically provides data communication through one or more networks to other data devices. For example, network link 35 may provide a connection through local network 34 to a host computer 32 or to data equipment operated by an Internet Service Provider ("ISP") 38. ISP 38 in turn provides data communication services through the Internet 36. Local network 34 and Internet 36 both use electrical, electromagnetic or optical signals that carry digital data streams. The signals through the various networks and the signals on network link 35 and through communication interface 20, which carry the digital data to and from computer system 800, are example forms of transmission media.

System 10 can send messages and receive data, including program code, through the network(s), network link 35 and communication interface 20. In the Internet example, a server 40 might transmit a requested code for an application program through Internet 36, ISP 38, local network 34 and communication interface 20. The received code may be executed by processor 22 as it is received, and/or stored in database 17, or other non-volatile storage for later execution.

In one embodiment, system 10 is a computing/data processing system including an application or collection of distributed applications for enterprise organizations, and may also implement logistics, manufacturing, and inventory management functionality. The applications and computing system 10 may be configured to operate locally or be implemented as a cloud-based networking system, for example in an infrastructure-as-a-service ("IAAS"), platform-as-a-service ("PAAS"), software-as-a-service ("SAAS") architecture, or other type of computing solution.

As disclosed, as part of providing cloud based applications, and improving such applications, new software features are continuously being developed. It is important to ensure that the feature is made available to a given user reliably. For example, if a user was to see a new feature today, it should be visible to them continually going forward.

Typically, some information about the user (e.g. user ID, username or email address) is used to identify a subset of users to make the feature available. For example, in a new feature rollout, any user with an @oracle.com email address may initially see the new feature while the feature is not made available to any other users.

For example, known onboarding systems generally incorporate the following functionality: (1) The user initiates the process by sending a request to authenticate; (2) The authentication process authenticates the user using credentials, such as username and password; (3) Once successfully authenticated, the system has access to user information such as the username, a user ID, the organization the user belongs to, etc.; (4) Using this information, an appropriate experience can be provided/mapped to the user. For example, any user from an organization XYZ can be provided with the new experience while all the other users will still be sent to the previous experience.

However, the known onboarding systems generally cannot provide a new feature/experience reliably to the user if that new feature is part of the authentication process itself. Because the user information is not available at that time, options include randomizing the authentication experience, but this leads to user frustration. Another option is to provide different users with a completely different Uniform Resource Locator ("URL") used to log into the application. However, this leads to user confusion and requires manually informing some users to use the new experience.

Figure 3:
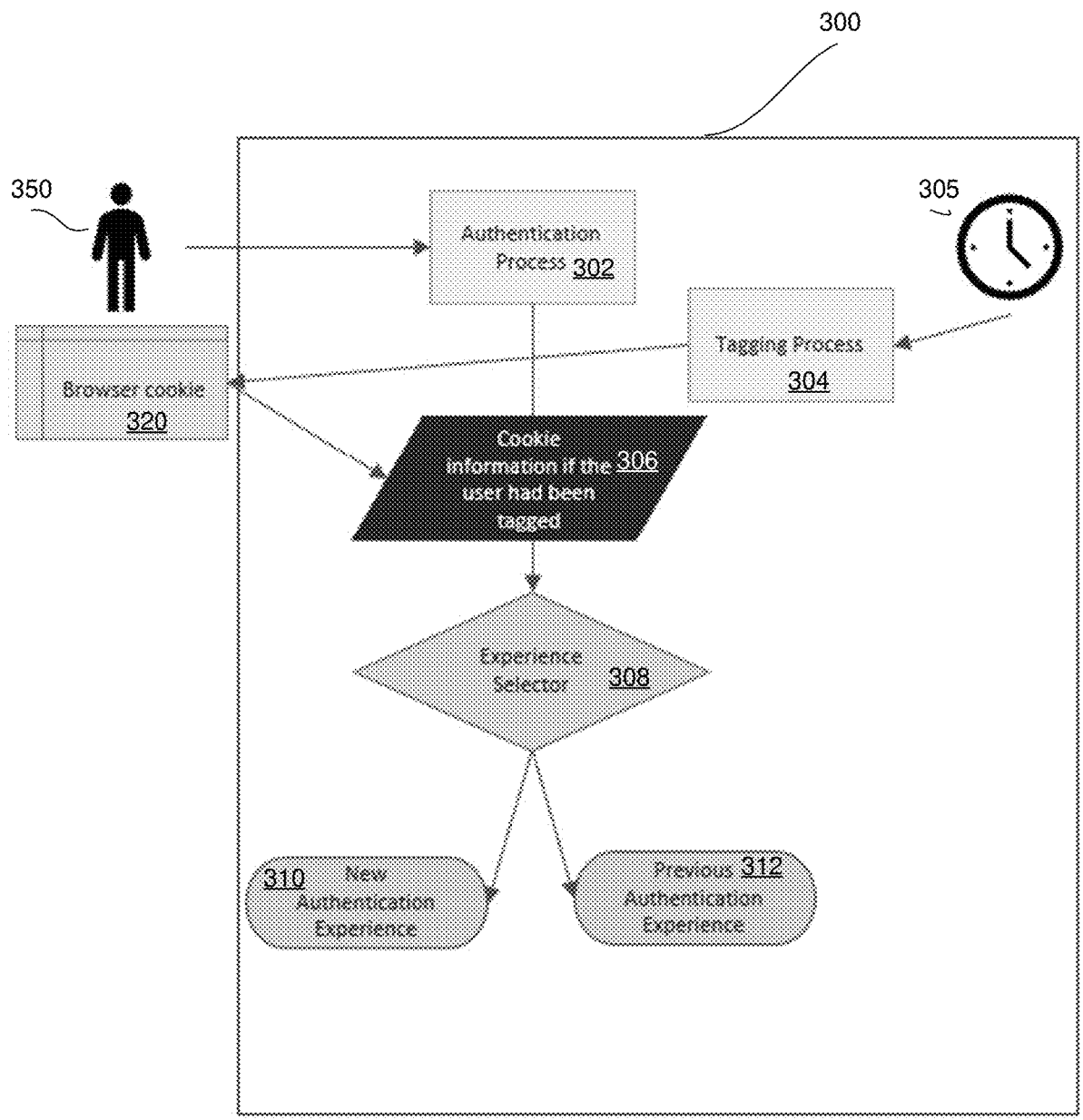
FIG. 3 is a flow/block diagram of the functionality of new feature onboarding module of FIG. 2 when providing new feature onboarding for cloud based applications in accordance to embodiments.

In contrast with known new feature onboarding systems, embodiments provide a consistent experience to the user once the user is selected for the new authentication experience/feature (e.g., from that point onwards, the user will always see the new experience). Embodiments allows for an expansion of the selected user group to hundreds of thousands of users relatively quickly because user communications is not relied on. Further, with embodiments, the process is opaque to the user because the user does not have to proactively take any action to be selected for the new authentication experience FIG. 3 is a flow/block diagram of the functionality 300 of new feature onboarding module 16 of FIG. 2 when providing new feature onboarding for cloud based applications in accordance to embodiments. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Functionality 300 includes an authentication process 302 for the application which authenticates a user 350 (e.g., login in via userID and password) when attempting to access the application. Authentication process 302 in embodiments is the functionality of the application that includes the new feature that is being onboarded to the user. In embodiments, user 350 accesses that application and authentication process 302 on the cloud 104 via a browser executing on client device 106.

Functionality 300 further includes a tagging process 304. Tagging process 304 receives a time window 305 to onboard users to the new experience, and enables the tagging process during that time (e.g., Monday from 9 am-10 am). During the tagging process time window, authentication process 302 includes the new feature. Outside of the tagging process time window, authentication process 302 does not include the new feature.

During the tagging process time window, tagging process 304 places/associates a unique cookie 320 with the browser of any user who attempts to authenticate to the system during that time. In embodiments, cookie 320 is a Hypertext Transfer Protocol ("HTTP") cookie, which is a small block of data created by a web server while a user is browsing a website and placed on the user's computer or other device by the user's web browser.

At 306, upon any subsequent attempt at authentication by the user, functionality 300 determines if the user has been tagged by checking if the user has cookie 320. An experience selector 308 directs the user to the new authentication experience at all times if they were previously tagged by tagging process 304. This is done by checking for the unique cookie 320 in their browser. If tagged (i.e., has cookie), experience selector 308 provides the new authentication experience (i.e., the authentication process that incorporates the new feature). In not tagged (i.e., no cookie), experience selector 308 provides the previous authentication experience (i.e., the authentication process that does not incorporate the new feature).

As a result of functionality 300, once tagged, a given user will reliably have the same new authentication experience. When more users are needed to be onboarded, tagging process 304 can be enabled to run for longer time windows until all users are onboarded seamlessly.

Figure 4:
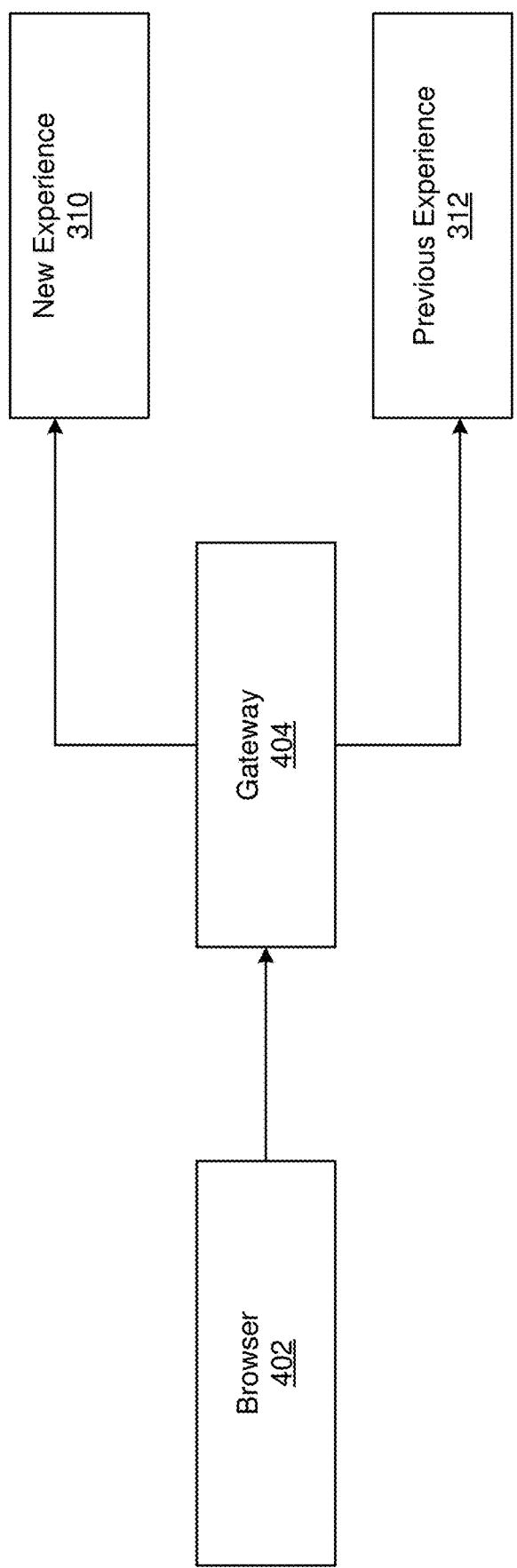
FIG. 4 is a block diagram of the functionality of the system, including new feature onboarding system, in accordance to embodiments.

FIG. 4 is a block diagram of the functionality of system 100, including new feature onboarding system 10, in accordance to embodiments. The authentication request (e.g., a request to login to a cloud based application) from the user is received from a browser 402 executing on a client device 106. A gateway 404 (implemented by experience selector 308) then determines whether to route the request to the previous experience (i.e., the authentication functionality without the new feature) or the new experience (i.e., the authentication functionality with the new feature) based on the presence of the cookie 320 on the browser 402.

Experience selector 308 in embodiments includes a dynamic mode switch that can be transitioned between multiple states to control the process. The switch has four states or modes of operation:

1. Off-Old experience is served for all users. This is the initial state.
2. Onboarding-Users entering the site's experience are onboarded to the new experience.
3. Selected-Users who have been onboarded are directed to the new experience.
4. On-New experience is served for all users.

Embodiments include the Off/Initial state (i.e., full disabled), where all requests are sent to the current experience, and users do not experience any changes. If a critical issue is later found impacting a sufficiently large number of users, this state can be selected to turn off the new experience for all users.

In embodiments, when ready to introduce a new set of users to the new experience, the mode is set to Onboarding to begin the tagging process. When a request comes into the experience via gateway 404 in this state, an internal header is added to the request to mark the user as a candidate for onboarding. When the internal header is present, the new experience sets persistent cookie 320 in the response to mark the user's browser as onboarded. Users onboarded are sent to the new experience. Example of the added pseudocode is a follows:
Set RequestHeader X-NEW-EXPERIENCE=enabled
Route new-experience After onboarding sufficient users, in embodiments the state is set to Selected. When a request comes into the experience via the gateway 404 in this state, a determination is made based on the presence of the persistent cookie 320:
If the cookie is present, the request is directed to the new experience 310
If the cookie is not present, the request is directed to the current experience 320.

This allows monitoring of the system and user behaviour in order to gain confidence with the new experience before onboarding more users using the Tagging Process disclosed above. Example pseudocode in embodiments for evaluating the user experience is as follows:
<If Cookie NEW-EXPERIENCE is present>
Route new-experience
<Else>
Route current-experience
<End>

To enable the new experience for all users, the mode is set to On to enter the Fully enabled final state. In this state, the gateway 404 will direct all requests to the new experience 310, regardless of cookie 320 presence. In embodiments, cookie 320 is not added to the user's response in this mode, so it is still possible to fall back to the Evaluate User Experience phase without having onboarded more users. Example pseudocode for the "On" mode is as follows:
RouteTo new-experience Example Cloud Infrastructure FIGS. 5-8 illustrate an example cloud infrastructure that can incorporate network cloud 104 that can include new feature onboarding system 10 of FIG. 1 in accordance to embodiments.

As disclosed above, infrastructure as a service ("IaaS") is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network ("WAN"), such as the Internet, and can use the cloud provider's services to install the remaining elements of an application stack. For example, the user can log in to the IaaS platform to create virtual machines ("VM"s), install operating systems ("OS"s) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds ("VPC"s) (e.g., a potentially on-demand pool of configurable and/or shared computing resources), also known as a core network. In some examples, there may also be one or more security group rules provisioned to define how the security of the network will be set up and one or more virtual machines. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
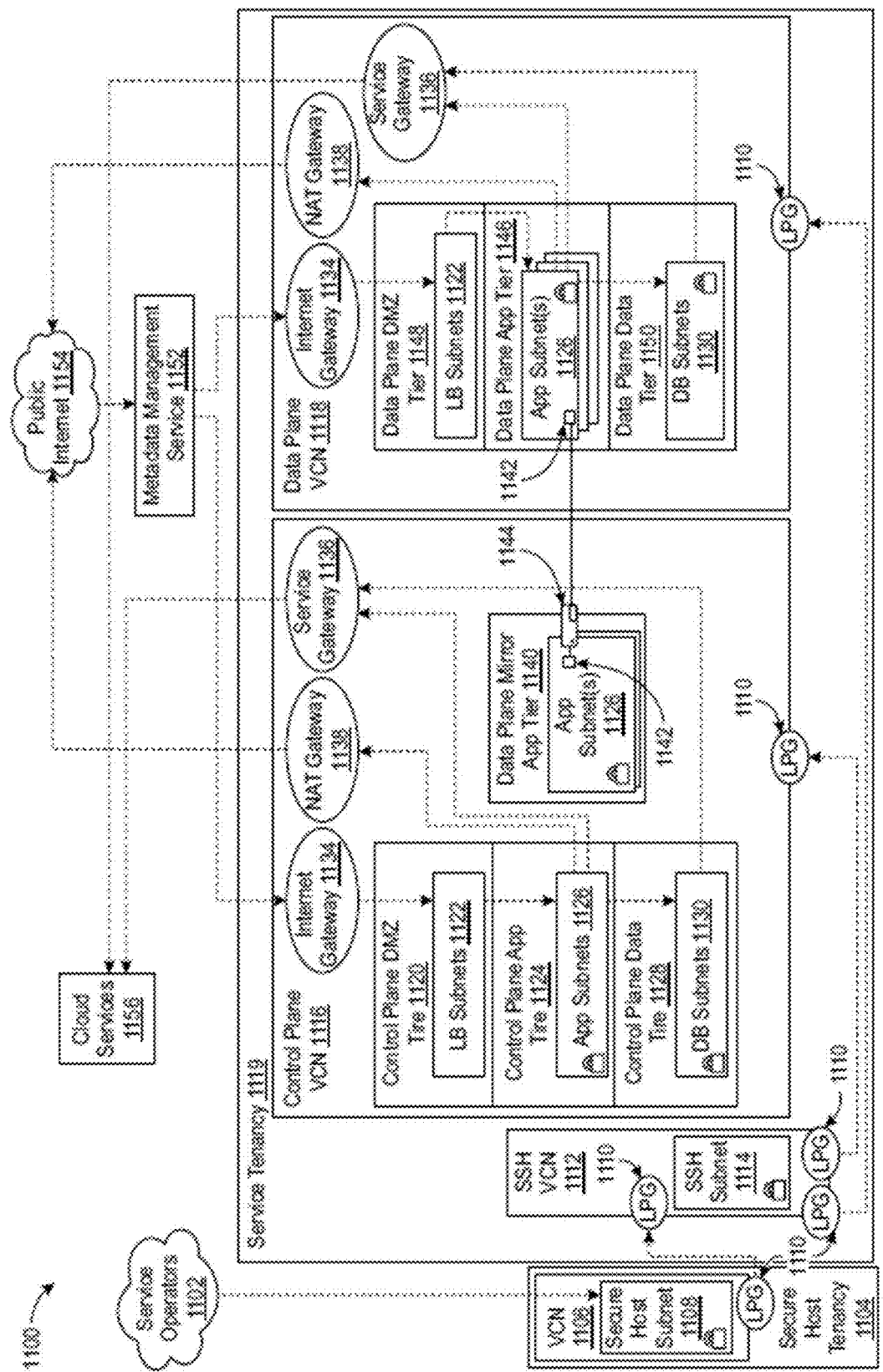
FIGS. 5-8 illustrate an example cloud infrastructure that can incorporate the network cloud that can include the new feature onboarding system of FIG. 1 in accordance to embodiments.

FIG. 5 is a block diagram 1100 illustrating an example pattern of an IaaS architecture, according to at least one embodiment. Service operators 1102 can be communicatively coupled to a secure host tenancy 1104 that can include a virtual cloud network ("VCN") 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service ("SMS"), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway ("LPG") 1110 that can be communicatively coupled to a secure shell ("SSH") VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone ("DMZ") tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer ("LB") subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface ("API") calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete ("CRUD") operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 6:
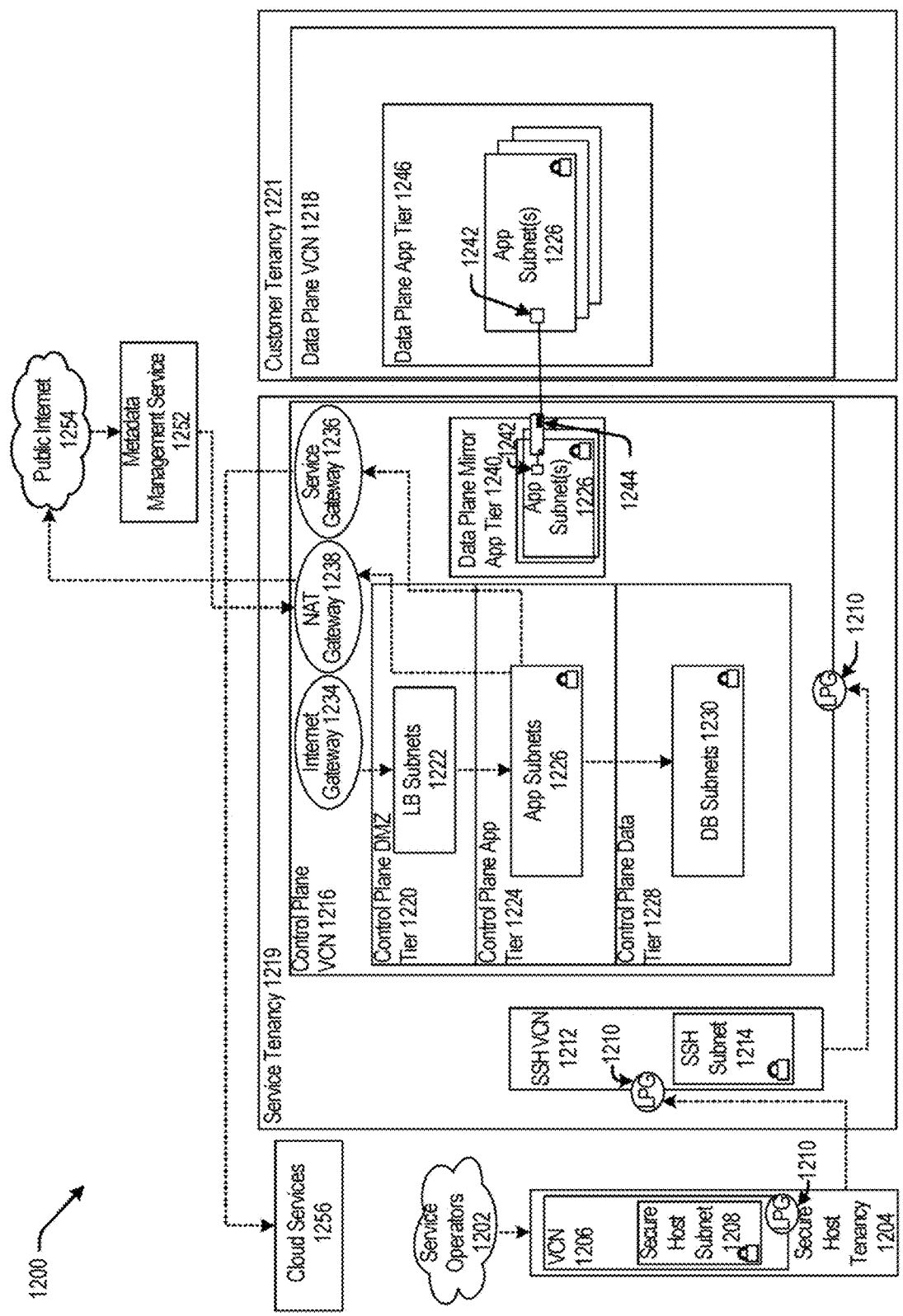

FIG. 6 is a block diagram 1200 illustrating another example pattern of an IaaS architecture, according to at least one embodiment. Service operators 1202 (e.g. service operators 1102) can be communicatively coupled to a secure host tenancy 1204 (e.g. the secure host tenancy 1104) that can include a virtual cloud network (VCN) 1206 (e.g. the VCN 1106) and a secure host subnet 1208 (e.g. the secure host subnet 1108). The VCN 1206 can include a local peering gateway (LPG) 1210 (e.g. the LPG 1110) that can be communicatively coupled to a secure shell (SSH) VCN 1212 (e.g. the SSH VCN 1112 10) via an LPG 1110 contained in the SSH VCN 1212. The SSH VCN 1212 can include an SSH subnet 1214 (e.g. the SSH subnet 1114), and the SSH VCN 1212 can be communicatively coupled to a control plane VCN 1216 (e.g. the control plane VCN 1116) via an LPG 1210 contained in the control plane VCN 1216. The control plane VCN 1216 can be contained in a service tenancy 1219 (e.g. the service tenancy 1119), and the data plane VCN 1218 (e.g. the data plane VCN 1118) can be contained in a customer tenancy 1221 that may be owned or operated by users, or customers, of the system.

The control plane VCN 1216 can include a control plane DMZ tier 1220 (e.g. the control plane DMZ tier 1120) that can include LB subnet(s) 1222 (e.g. LB subnet(s) 1122), a control plane app tier 1224 (e.g. the control plane app tier 1124) that can include app subnet(s) 1226 (e.g. app subnet(s) 1126), a control plane data tier 1228 (e.g. the control plane data tier 1128) that can include database (DB) subnet(s) 1230 (e.g. similar to DB subnet(s) 1130). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134) that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238 (e.g. the NAT gateway 1138). The control plane VCN 1216 can include the service gateway 1236 and the NAT gateway 1238.

The control plane VCN 1216 can include a data plane mirror app tier 1240 (e.g. the data plane mirror app tier 1140) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152) that can be communicatively coupled to public Internet 1254 (e.g. public Internet 1154). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218, but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 8," may be located in Region 1 and in "Region 2." If a call to Deployment 8 is made by the service gateway 1236 contained in the control plane VCN 1216 located in Region 1, the call may be transmitted to Deployment 8 in Region 1. In this example, the control plane VCN 1216, or Deployment 8 in Region 1, may not be communicatively coupled to, or otherwise in communication with, Deployment 8 in Region 2.

Figure 7:
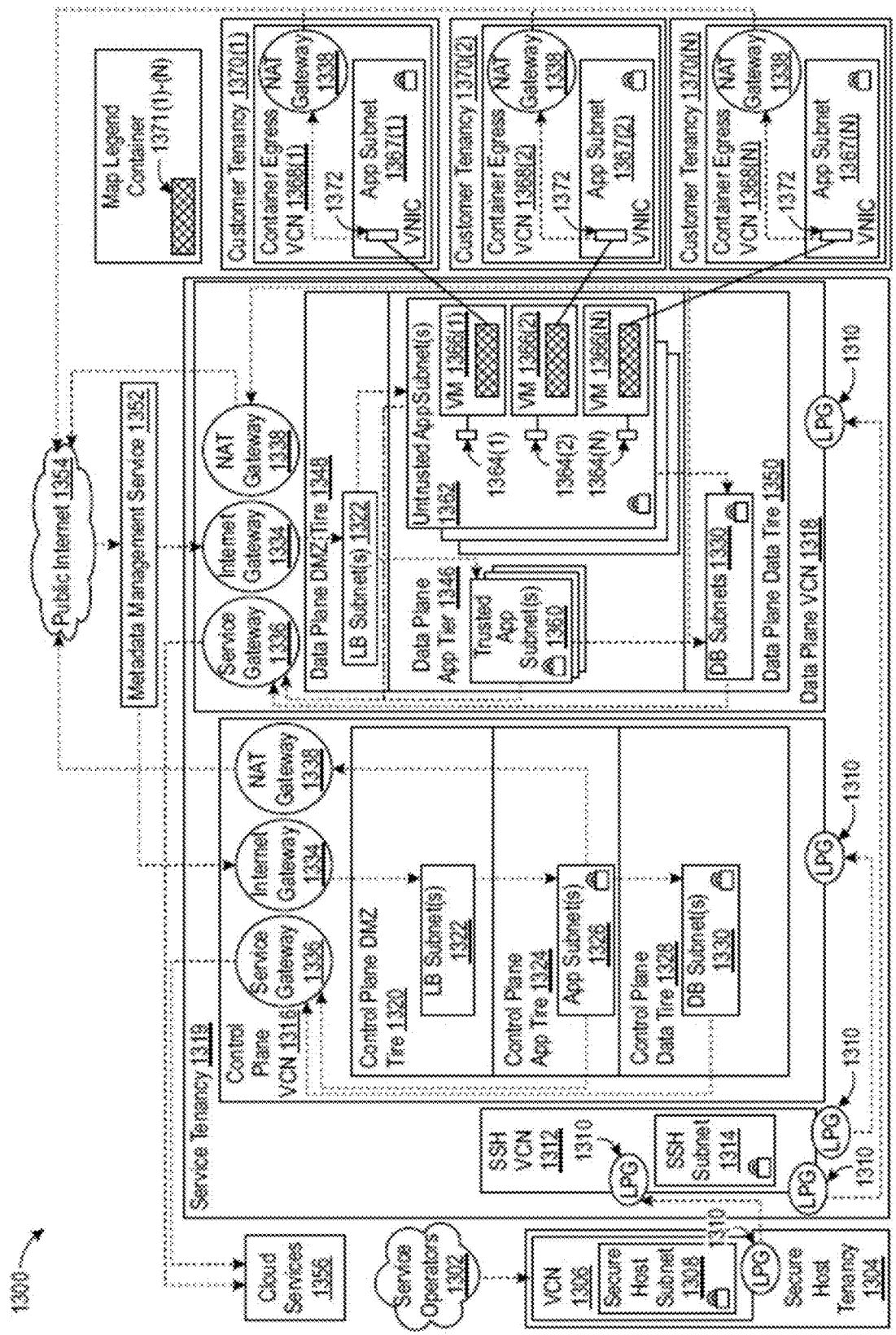

FIG. 7 is a block diagram 1300 illustrating another example pattern of an IaaS architecture, according to at least one embodiment. Service operators 1302 (e.g. service operators 1102) can be communicatively coupled to a secure host tenancy 1304 (e.g. the secure host tenancy 1104) that can include a virtual cloud network (VCN) 1306 (e.g. the VCN 1106) and a secure host subnet 1308 (e.g. the secure host subnet 1108). The VCN 1306 can include an LPG 1310 (e.g. the LPG 1110) that can be communicatively coupled to an SSH VCN 1312 (e.g. the SSH VCN 1112) via an LPG 1310 contained in the SSH VCN 1312. The SSH VCN 1312 can include an SSH subnet 1314 (e.g. the SSH subnet 1114), and the SSH VCN 1312 can be communicatively coupled to a control plane VCN 1316 (e.g. the control plane VCN 1116) via an LPG 1310 contained in the control plane VCN 1316 and to a data plane VCN 1318 (e.g. the data plane 1118) via an LPG 1310 contained in the data plane VCN 1318. The control plane VCN 1316 and the data plane VCN 1318 can be contained in a service tenancy 1319 (e.g. the service tenancy 1119).

The control plane VCN 1316 can include a control plane DMZ tier 1320 (e.g. the control plane DMZ tier 1120) that can include load balancer ("LB") subnet(s) 1322 (e.g. LB subnet(s) 1122), a control plane app tier 1324 (e.g. the control plane app tier 1124) that can include app subnet(s) 1326 (e.g. similar to app subnet(s) 1126), a control plane data tier 1328 (e.g. the control plane data tier 1128) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134) that can be contained in the control plane VCN 1316, and the app subnet(s) 1326 can be communicatively coupled to the DB subnet(s) 1330 contained in the control plane data tier 1328 and to a service gateway 1336 (e.g. the service gateway) and a network address translation (NAT) gateway 1338 (e.g. the NAT gateway 1138). The control plane VCN 1316 can include the service gateway 1336 and the NAT gateway 1338.

The data plane VCN 1318 can include a data plane app tier 1346 (e.g. the data plane app tier 1146), a data plane DMZ tier 1348 (e.g. the data plane DMZ tier 1148), and a data plane data tier 1350 (e.g. the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154).

The Internet gateway 1334 contained in the control plane VCN 1316 and contained in the data plane VCN 1318 can be communicatively coupled to a metadata management service 1352 (e.g. the metadata management system 1152) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 8:
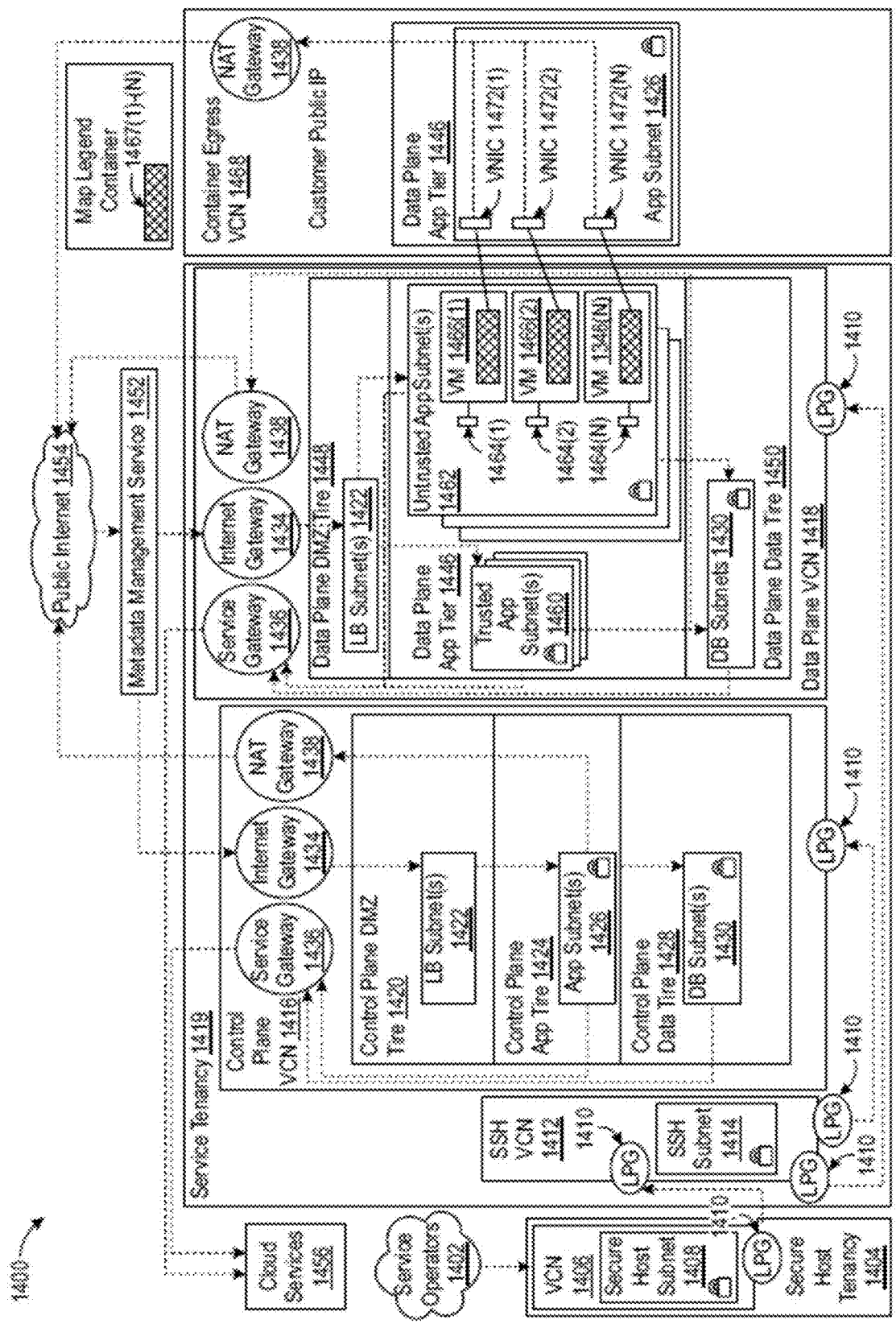

FIG. 8 is a block diagram 1400 illustrating another example pattern of an IaaS architecture, according to at least one embodiment. Service operators 1402 (e.g. service operators 1102) can be communicatively coupled to a secure host tenancy 1404 (e.g. the secure host tenancy 1104) that can include a virtual cloud network ("VCN") 1406 (e.g. the VCN 1106) and a secure host subnet 1408 (e.g. the secure host subnet 1108). The VCN 1406 can include an LPG 1410 (e.g. the LPG 1110) that can be communicatively coupled to an SSH VCN 1412 (e.g. the SSH VCN 1112) via an LPG 1410 contained in the SSH VCN 1412. The SSH VCN 1412 can include an SSH subnet 1414 (e.g. the SSH subnet 1114), and the SSH VCN 1412 can be communicatively coupled to a control plane VCN 1416 (e.g. the control plane VCN 1116) via an LPG 1410 contained in the control plane VCN 1416 and to a data plane VCN 1418 (e.g. the data plane 1118) via an LPG 1410 contained in the data plane VCN 1418. The control plane VCN 1416 and the data plane VCN 1418 can be contained in a service tenancy 1419 (e.g. the service tenancy 1119).

The control plane VCN 1416 can include a control plane DMZ tier 1420 (e.g. the control plane DMZ tier 1120) that can include LB subnet(s) 1422 (e.g. LB subnet(s) 1122), a control plane app tier 1424 (e.g. the control plane app tier 1124) that can include app subnet(s) 1426 (e.g. app subnet(s) 1126), a control plane data tier 1428 (e.g. the control plane data tier 1128) that can include DB subnet(s) 1430 (e.g. DB subnet(s) 1330). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 11) and a network address translation (NAT) gateway 1438 (e.g. the NAT gateway 1138 of FIG. 11). The control plane VCN 1416 can include the service gateway 1436 and the NAT gateway 1438.

The data plane VCN 1418 can include a data plane app tier 1446 (e.g. the data plane app tier 1146), a data plane DMZ tier 1448 (e.g. the data plane DMZ tier 1148), and a data plane data tier 1450 (e.g. the data plane data tier 1150). The data plane DMZ tier 1448 can include LB subnet(s) 1422 that can be communicatively coupled to trusted app subnet(s) 1460 (e.g. trusted app subnet(s) 1360) and untrusted app subnet(s) 1462 (e.g. untrusted app subnet(s) 1362) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154).

The Internet gateway 1434 contained in the control plane VCN 1416 and contained in the data plane VCN 1418 can be communicatively coupled to a metadata management service 1452 (e.g. the metadata management system 1152) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 8 may be considered an exception to the pattern illustrated by the architecture of block diagram 1300 of FIG. 7 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

As disclosed, embodiments providing an onboarding for new features by operating in two modes: "onboarding" and "regular" modes. When the system is set to "onboarding" mode for a period of time, it places a cookie on the user's browser every time it receives a web request, which could be for authentication or other function. The cookie identifies that user as "onboarded" to the new experience. When the service is operating in any ("onboarding" or "regular") mode, it checks for the presence of the cookie before presenting the login experience to the user. If the cookie is present, the user sees the new login experience. If the cookie is not present, the user see the previous login experience. To onboard more users, the service can be switched to operate in the "onboarding" mode for a longer time period. As cookies are long living, the user will reliably see the feature when using the same device.

Onboarding in accordance to embodiments is reliable because a user from a given device will always see the same experience/feature, thus reducing the confusion of a new experience. Embodiments provide the ability to make a service/feature available to users who are not yet identified by the cloud service in a reliable way.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of onboarding users of a cloud based application from an old authentication process to a new authentication process, wherein the old authentication process implements a first functionality when authenticating a user, and the new authentication process implements a second functionality that is different than the first functionality when authenticating the user, the method comprising:
receiving an onboarding time window;
receiving a first authentication request from the user via a browser;
when the first authentication request is received during the onboarding time window, associating a cookie with the browser and using the new authentication process comprising the second functionality to authenticate the user in response to the first authentication request;
when the first authentication request is received outside of the onboarding time window, using the old authentication process comprising the first functionality to authenticate the user in response to the first authentication request;
subsequent to receiving the first authentication request, receiving a second authentication request from the user via the browser;
determining if the browser is associated with the cookie;
when the browser is associated with the cookie, using the new authentication process comprising the second functionality to authenticate the user in response to the second authentication request; and
when the browser is not associated with the cookie, using the old authentication process comprising the first functionality to authenticate the user in response to the second authentication request.

2. The method of claim 1, wherein the user is authenticated for use of the cloud based application by receiving a user identification and a password from the user.

3. The method of claim 1, wherein associating the cookie with the browser comprises storing a unique Hypertext Transfer Protocol cookie on a device that is executing the browser.

4. The method of claim 1, wherein the new authentication process comprises the old authentication process with an addition of one or more new features.

5. The method of claim 1, further comprising adding an internal header to the first authentication request when the first authentication request is received during the onboarding time window.

6. The method of claim 1, wherein the second authentication request is not received during the onboarding time window.

7. The method of claim 1, further comprising an on mode where all further authentication requests use the new authentication process to authenticate the user.

8. A non-transitory computer readable medium having instructions stored thereon that, when executed by one or more processors, cause the processors to onboard users of a cloud based application from an old authentication process to a new authentication process, wherein the old authentication process implements a first functionality when authenticating a user, and the new authentication process implements a second functionality that is different than the first functionality when authenticating the user, the onboarding comprising:
   receiving an onboarding time window;
   receiving a first authentication request from the user via a browser;
   when the first authentication request is received during the onboarding time window, associating a cookie with the browser and using the new authentication process comprising the second functionality to authenticate the user in response to the first authentication request;
   when the first authentication request is received outside of the onboarding time window, using the old authentication process comprising the first functionality to authenticate the user in response to the first authentication request;
   subsequent to receiving the first authentication request, receiving a second authentication request from the user via the browser;
   determining if the browser is associated with the cookie;
   when the browser is associated with the cookie, using the new authentication process comprising the second functionality to authenticate the user in response to the second authentication request; and
   when the browser is not associated with the cookie, using the old authentication process comprising the first functionality to authenticate the user in response to the second authentication request.

9. The computer readable medium of claim 8, wherein the user is authenticated for use of the cloud based application by receiving a user identification and a password from the user.

10. The computer readable medium of claim 8, wherein associating the cookie with the browser comprises storing a unique Hypertext Transfer Protocol cookie on a device that is executing the browser.

11. The computer readable medium of claim 8, wherein the new authentication process comprises the old authentication process with an addition of one or more new features.

12. The computer readable medium of claim 8, the onboarding further comprising adding an internal header to the first authentication request when the first authentication request is received during the onboarding time window.

13. The computer readable medium of claim 9, wherein the second authentication request is not received during the onboarding time window.

14. The computer readable medium of claim 8, the onboarding further comprising an on mode where all further authentication requests use the new authentication process to authenticate the user.

15. A cloud based onboarding system for onboarding users of a cloud based application from an old authentication process to a new authentication process, wherein the old authentication process implements a first functionality when authenticating a user, and the new authentication process implements a second functionality that is different than the first functionality when authenticating the user, the system comprising:
   one or more processors in communication with a user via a browser, the processors adapted to:
      receive an onboarding time window;
      receive a first authentication request from the user via the browser;
      when the first authentication request is received during the onboarding time window, associate a cookie with the browser and use the new authentication process comprising the second functionality to authenticate the user in response to the first authentication request; and
      when the first authentication request is received outside of the onboarding time window, use the old authentication process comprising the first functionality to authenticate the user in response to the first authentication request;
      subsequent to receiving the first authentication request, receive a second authentication request from the user via the browser;
      determine if the browser is associated with the cookie;
      when the browser is associated with the cookie, use the new authentication process comprising the second functionality to authenticate the user in response to the second authentication request; and
      when the browser is not associated with the cookie, use the old authentication process comprising the first functionality to authenticate the user in response to the second authentication request.

16. The system of claim 15, wherein the user is authenticated for use of the cloud based application by receiving a user identification and a password from the user.

17. The system of claim 15, wherein associating the cookie with the browser comprises storing a unique Hypertext Transfer Protocol cookie on a device that is executing the browser.

18. The system of claim 15, wherein the new authentication process comprises the old authentication process with an addition of one or more new features.

19. The system of claim 15, the processors further adapted to add an internal header to the first authentication request when the first authentication request is received during the onboarding time window.

20. The system of claim 15, wherein the second authentication request is not received during the onboarding time window.

\* \* \* \* \*